(12) United States Patent
Denbratt et al.

(10) Patent No.: US 6,443,122 B1
(45) Date of Patent: Sep. 3, 2002

(54) INTERNAL COMBUSTION ENGINE

(75) Inventors: Ingemar Denbratt, Kullavik; Jonny Nisbet, Torslanda; Henrik Oest Simonsen, Molndal; Lars-Olof Carlsson, Gothenburg, all of (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 09/700,340

(22) PCT Filed: May 14, 1999

(86) PCT No.: PCT/SE99/00827

§ 371 (c)(1),
(2), (4) Date: Dec. 28, 2000

(87) PCT Pub. No.: WO99/58830

PCT Pub. Date: Nov. 18, 1999

(30) Foreign Application Priority Data

May 14, 1998 (SE) .............................................. 9801699

(51) Int. Cl.[7] .................................................. F02F 3/26

(52) U.S. Cl. ........................ 123/301; 123/276; 123/279

(58) Field of Search ................................. 123/301, 276, 123/263, 269, 279, 290, 302, 305, 295

(56) References Cited

U.S. PATENT DOCUMENTS

| | | | | | |
|---|---|---|---|---|---|
| 4,958,604 | A | * | 9/1990 | Hashimoto | 123/276 |
| 5,327,864 | A | * | 7/1994 | Regueiro | 123/260 |
| 5,735,240 | A | * | 4/1998 | Ito et al. | 123/295 |
| 5,943,993 | A | * | 8/1999 | Carstensen et al. | 123/298 |
| 6,158,410 | A | * | 12/2000 | Piock et al. | 123/301 |
| 6,286,477 | B1 | * | 9/2001 | Yang et al. | 123/276 |

* cited by examiner

Primary Examiner—Willis R. Wolfe
Assistant Examiner—Mahmoud Gimie
(74) Attorney, Agent, or Firm—Young & Thompson

(57) ABSTRACT

Internal combustion engine with fuel injection directly into the combustion chamber of the engine. The engine has inlet channels, the angle of incidence (valve angle) ($\alpha$) of which is greater than 20° relative to the longitudinal axis of the cylinder chamber. The piston tops are made, firstly, with a surface portion inclined relative to a plane normal to the longitudinal axis of the cylinder chamber by an angle ($\gamma$) equal to or less than the angle of incidence of the inlet channel, and, secondly, with a cavity connected to the inclined surface portion. By interaction between the angle of incidence of the inlet channels and the shape of the piston tops, there is generated in the combustion chambers a primary vortical movement in the inlet air about an axis perpendicular to the longitudinal axis of the cylinder chamber. The primary vortical movement generates a secondary vortical movement in the opposite direction in the piston cavity.

9 Claims, 2 Drawing Sheets

INTERNAL COMBUSTION ENGINE

The present invention relates to an internal combustion engine, comprising a cylinder block with at least one cylinder chamber, a piston movable in the cylinder chamber, a cylinder head, and, in the cylinder head at least one exhaust channel having an openable and closable outlet from the cylinder chamber and at least one inlet channel having an openable and closable inlet valve to the cylinder chamber, said inlet forming an angle relative to the direction of movement of the piston, at least one spark plug protruding into the cylinder chamber, and a fuel injector, arranged to inject fuel directly into the cylinder chamber in a direction oblique to the direction of movement of the piston, said piston having a top with a surface portion forming an angle with a plane normal to the direction of movement of the piston and connected to a bowl-shaped cavity, which, together with said surface portion, is disposed to impart air flowing into the cylinder chamber a vortical movement about an axis perpendicular to the direction of movement of the piston.

BACKGROUND OF THE INVENTION

The motor vehicle industry has of late put more and more effort into developing spark ignition internal combustion engines with direct injection systems, i.e. systems which inject the fuel directly into the cylinder chamber instead of into the inlet manifold. It is a known fact that by injecting the fuel directly into the combustion chamber and stratifying the fuel-air mixture, so that a non-homogeneous mixture with a concentration of the fuel in the area around the spark plug is obtained, it is possible to have the engine operate with a very lean mixture of air and fuel. This is utilized in the latest generation of gasoline engines with fuel injection during engine operation at low partial loads, when the fuel/air ratio can be kept as low as 1:35, to be compared with a fuel/air ratio of 1:14 in a conventional engine without direct injection working with an homogeneous fuel-air mixture over its entire load and rpm range. By operating the engine with this lean mixture at low partial loads, the total fuel consumption of the engine can be substantially reduced thus reducing, operating costs and environmental impact.

A number of solutions have been suggested to solve the problem of achieving this stratified fuel-air mixture, which provides a concentration of fuel in the area about the spark plug. Common to all of them is that a vortex is generated in the inlet air and that the fuel is injected into the combustion chamber in such a manner in relation to the air vortex that the fuel is transported up to the area about the spark plug, so that the concentration of fuel in the fuel-air mixture will be higher in the vicinity of the spark plug than in the peripheral area of the combustion chamber.

It is known to generate the vortex either about an axis perpendicular to the direction of movement of the piston, as in the combustion engine described by way of introduction, or about an axis in the direction of movement of the piston. The first type of vortex is usually named "tumble" and the second is named "swirl". The vortex about the horizontal axis is obtained by interaction between the valve angle, i.e. the angle of incidence of the inlet channel, the shape of the channel and the shape of the top of the piston. With varying valve angles, piston top shapes and injection angles, various results are obtained with regard to stratification of the fuel-air mixture at low partial loads, but other factors as well, such as the level of turbulence at the moment of ignition in the homogeneous fuel-air mixture at higher partial loads and full load are affected. These factors in turn affect the increase in efficiency which can be obtained in combination with the operating quality of the engine and the exhaust emissions compared to an engine without direct injection, which always works with a homogeneous fuel-air mixture.

SUMMARY OF THE INVENTION

The purpose of the present invention is in general, starting from a known internal combustion engine of the type described by way of introduction, to achieve an engine which has a higher efficiency than what has hitherto been achievable, at the same time as the running quality is high and its exhaust emissions are low.

This is achieved according to the invention by virtue of the fact that the angle between said surface portion and said plane normal to the direction of movement of the piston, and the angle between the mouth of the inlet channel and the direction of movement of the piston are so selected in relation to each other and to the direction of movement of the piston that, during predetermined operating conditions, the inlet air flowing into the cylinder chamber outside the piston cavity is imparted a primary vortical movement which generates a secondary vortical movement in the opposite direction in the piston cavity.

It has been shown that it is thereby possible to obtain a gas movement, which has a suitable combination of injection characteristic and injection timing to provide a suitable fuel-air mixture at the spark plug at the point of ignition and a sufficient level of turbulence in the combustion chamber during stratified operation (low partial loads). Furthermore, there is obtained during homogeneous operation (higher partial load and full load) a homogeneous fuel-air mixture with sufficient level of turbulence at the moment of ignition.

Tests performed have shown that the above specified gas movement is obtained if the valve angle (the angle of incidence of the inlet channel) is greater than 20°, preferably at least 25° and at most 30°, if the angle between said surface portion and a plane normal to the direction of movement of the piston is equal to or less than the valve angle but preferably not less than 75% of the valve angle, and if the height of the piston cavity is at least 10% but at most 25% of the diameter of the cylinder.

BRIEF DESCRIPTION OF THE DRAWINGS

The invention will be described in more detail with reference to examples shown in the accompanying drawings, where.

DESCRIPTION OF THE PREFERRED EMBODIMENT

Figure 1:
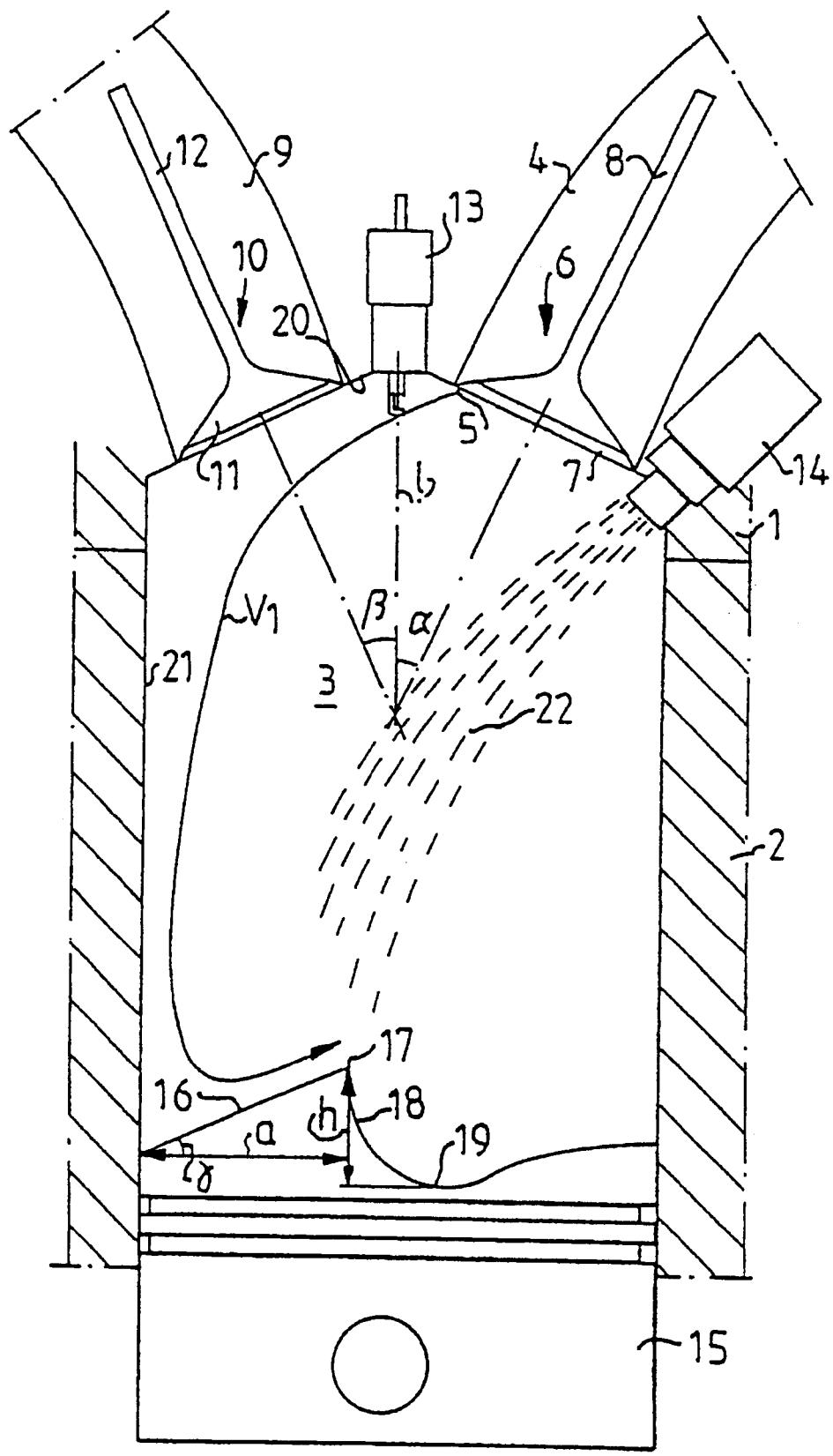
FIG. 1 shows a schematic cross-section through a cylinder head and a portion of a cylinder block of an internal combustion engine in accordance with the invention, during the piston inlet stroke.
Figure 2:
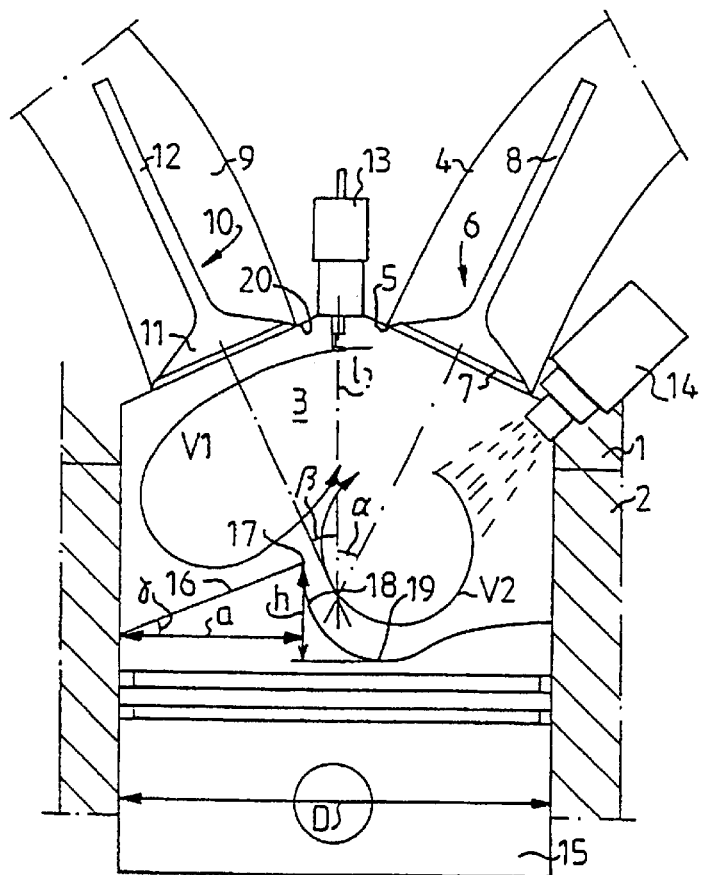
FIG. 2 shows a schematic cross-section corresponding to FIG. 1 but during the compression stroke.
Figure 3:
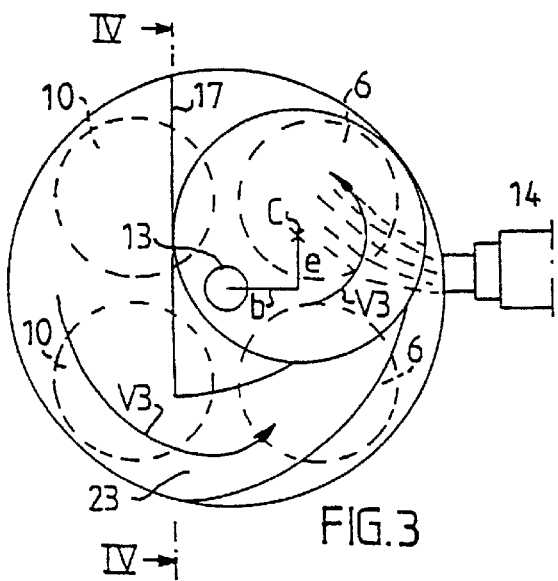
FIG. 3 shows a view of the top of the piston with valves and spark plugs schematically indicated.

In FIGS. 1 and 2, 1 designates a cylinder head and 2 designates a portion of a cylinder block, defining together a cylinder chamber 3, into which two inlet channels 4 open. Inlet valves 6 are arranged at the mouths 5 of the inlet channels 4. The valves 6 each have a valve disc 7 and a valve spindle 8. Two exhaust channels 9 lead from the cylinder chamber 3 and have exhaust valves 10, each having a valve disc 11 and a valve spindle 12. A spark plug 13 protrudes centrally into the upper end of the cylinder chamber 3. A fuel injector 14 is directed obliquely from the side into the cylinder chamber 3. The angle of the injector 14 relative to the longitudinal axis 1 of the cylinder chamber is approximately 45° in the example shown, and its deviation from purely axial injection is ca. 20° (FIG. 3). A piston 15 is displaceably mounted in the cylinder chamber 3. The top of the piston 15 has an inclined surface portion 16 leading up to a ridge 17, from which an inclined wall 18 leads into a bowl-shaped cavity 19 in the piston.

According to the invention, the angle of incidence of the inlet channel, which is defined as the angle $\alpha$ of the valve spindle 8 relative to the direction of movement of the piston, i.e. the longitudinal axis 1 of the cylinder chamber, must be greater than 20°. This angle $\alpha$ is 25° in the embodiment shown in the figures. The corresponding angle $\beta$ of the exhaust channel 9 is equal to the angle of incidence $\alpha$ of the inlet channel, which in the example shown provides a valve angle $\alpha+\beta=50°$. Furthermore, the angle $\gamma$ of the inclined portion 16 relative to a plane normal to the longitudinal axis 1 of the cylinder chamber must be equal to or less than a but not less than 75% of $\alpha$. The angle $\gamma$ in the example shown in the figures is 20°. The ridge 17 is displaced towards the exhaust side in order not to be too near to the spark plug 13. In the example shown, the distance a between the cylinder wall and the ridge 17 is ca. 40% of the cylinder diameter D. The height h from the bottom of the cavity 19 to the ridge 17 must be at least 10% of the cylinder diameter D. In the example shown, the height h is ca. 25% of the diameter D. The piston cavity 19 has its center c displaced towards the inlet side of the cylinder chamber by a distance b, which is to be approximately 10 to 25% of the cylinder diameter D. In the example shown, b is ca. 20% of the cylinder diameter. Furthermore, the center c of the piston cavity is displaced a distance e towards one inlet valve 6 from the midpoint between the two inlet valves. The distance e must be approximately 0 to 15% of the cylinder diameter D and in the example shown it is ca. 10% of the cylinder diameter D.

In an internal combustion engine with the above described characteristic, during the inlet phase, an air vortex is generated about an axis perpendicular to the longitudinal axis 1 of the cylinder. This air vortex, labelled $v_1$, in FIGS. 1 and 2 and referred to as the primary air vortex, is created by a larger portion of the inlet air flowing on the topside of the inlet valves 6 and being deflected by virtue of the angle of incidence of the inlet channels, the ceiling 20 of the combustion chamber on the exhaust side and the cylinder wall 21. A powerful primary air vortex $v_1$, is necessary, firstly, to generate a reverse secondary air vortex $v_2$ (see FIG. 2) in the piston cavity 19 and, secondly, to deflect the injected fuel during operation with homogeneous fuel-air mixture at high loads. The air vortex $v_1$, forces the fuel, as indicated at 22 in FIG. 1, down so that the air is prevented from penetrating too far and striking the cylinder wall 21 (FIG. 1).

Figure 4:
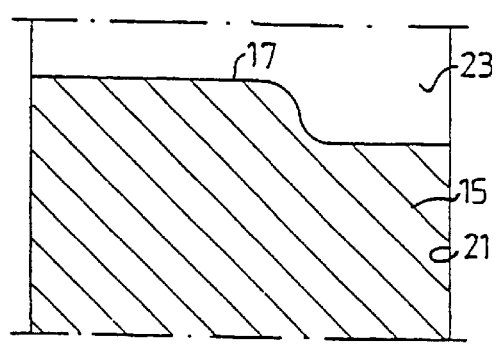
FIG. 4 shows a section along the line IV—IV in FIG. 3.

The reverse secondary air vortex $v_2$ is created by interaction between the primary air vortex $v_1$, the described geometric shape of the top of the piston, and the flow of the fuel during operation with stratified fuel-air mixture (delayed injection). The primary vortex $v_1$, is forced upwards by the inclined surface portion 16 of the piston and leaves the surface portion at the ridge 17. The primary vortex $v_1$, creates here by shear forces the secondary vortex $v_2$ in the piston cavity, the depth of which assures that the breakdown of the vortex $v_2$ to turbulence in the cavity will be minimized during the compression. A combination between the vortex flow $v_2$ about a horizontal axis and a vortex flow $v_3$ about an axis in the longitudinal direction of the cylinder chamber achieves a continuous transport of fuel towards the spark plug. The vortex flow about the axis in the longitudinal direction of the cylinder chamber is produced in a known manner by shutting off the inlet valve 6. In order to facilitate for the vortex $v_3$ to enter the piston cavity 19, the top of the piston is shaped asymmetrically, so that the top of the piston together with the surrounding cylinder wall 21 defines an inlet passage 23 to the cavity, as can be seen in FIGS. 3 and 4.

By virtue of the fact that a portion of the compression volume is present in the piston cavity 19, a compact fuel cloud is achieved during stratified operation and thus small cycle-to-cycle variations and small amounts of leaning hydrocarbons.

What is claimed is:

1. An internal combustion engine, comprising:
   a cylinder block with at least one cylinder chamber, a piston movable in the cylinder chamber, a cylinder head, and, in the cylinder head at least one exhaust channel having an openable and closable outlet from the cylinder chamber and at least one inlet channel having an openable and closable inlet valve to the cylinder chamber, said inlet forming an angle relative to the direction of movement of the piston, at least one spark plug protruding into the cylinder chamber, and a fuel injector, arranged to inject fuel directly into the cylinder chamber in a direction oblique to the direction of movement of the piston,
   said piston having a top with a surface portion forming an angle with a plane normal to the direction of movement of the piston and connected to a bowl-shaped cavity, which, together with said surface portion, is disposed to impart air flowing into the cylinder chamber a vortical movement about an axis perpendicular to the direction of movement of the piston,
   wherein the angle ($\gamma$) between said surface portion (16) and said plane normal to the direction of movement (1) of the piston (15), and the angle ($\alpha$) between the mouth (5) of the inlet channel and the direction of movement of the piston are so selected in relation to each other and to the direction of movement of the piston that, during predetermined operating conditions, the inlet air flowing into the cylinder chamber (3) outside the piston cavity is imparted a primary vortical movement ($v_1$) about an axis perpendicular to the direction of movement of the piston, said primary vortical movement generating a secondary vortical movement ($v_2$) in the opposite direction in the piston cavity (19), said secondary vortical movement also being about an axis perpendicular to the direction of movement of the piston.

2. The internal combustion engine according to claim 1, wherein the angle ($\alpha$) between the mouth (5) of the inlet channel (4) and the direction of movement (1) is greater than 20°.

3. The internal combustion engine according to claim 2, wherein the angle ($\alpha$) between the mouth (5) of the inlet channel (4) and the direction of movement (1) of the piston (15) is at least 25° and at most 30°.

4. The internal combustion engine according to claim 1, wherein the angle ($\gamma$) between said surface portion (16) and said plane normal to the direction of movement (1) of the piston (15) is less than or equal to the angle ($\alpha$) between the mouth (5) of the inlet channel and the direction of movement of the piston.

5. The internal combustion engine according to claim 4, wherein the angle ($\gamma$) between said surface portion (16) and the plane normal to the direction of movement of the piston (15) is at least 75% of the angle ($\alpha$) between the mouth (5) of the inlet channel and the direction of movement (1) of the piston.

6. The internal combustion engine according to claim 1, wherein the height (h) of said surface portion (16) above the bottom of the cavity (19) is at least 10% of the diameter of the piston.

7. The internal combustion engine according to claim 1, wherein the cavity (19) is mostly in a portion of the top of the piston facing towards the inlet side of the cylinder chamber (3), the center of said cavity being displaced from the center axis of the piston towards the inlet side a distance (b), which amounts to between 10% and 25% of the diameter of the piston.

8. The internal combustion engine according to claim 1, wherein the cylinder head (1) has at least two inlets (5) each provided with an inlet valve (6) for inlet air, and that the cavity (19) is displaced towards one of the inlets a distance (e), which amounts to between 0 and 15% of the diameter of the piston.

9. The internal combustion engine according to claim 1, wherein the top of the piston is shaped so that it, together with the surrounding cylinder wall (21) forms an inlet passage (23) to the piston cavity (19) for an air vortex ($v_3$) about an axis parallel to the cylinder axis (1).

* * * * *